UNITED STATES PATENT OFFICE.

WILLIAM H. WOOD AND GEORGE C. GILLMORE, OF NEWARK, NEW JERSEY, ASSIGNORS TO THE CELLULOID MANUFACTURING COMPANY, OF NEW YORK, N. Y.

PROCESS OF EMBOSSING SHEETS OF CELLULOID.

SPECIFICATION forming part of Reissued Letters Patent No. 11,074, dated April 15, 1890.

Original No. 421,367, dated February 11, 1890. Application for reissue filed March 18, 1890. Serial No. 344,425.

*To all whom it may concern:*

Be it known that we, WILLIAM H. WOOD and GEORGE C. GILLMORE, both of the city of Newark, county of Essex, and State of New Jersey, have invented certain new and useful Improvements in a Process of Embossing Sheets of Celluloid or Analogous Materials, of which the following is a specification.

The object of our invention is the production of embossed work on sheets of celluloid or other pyroxyline materials of like nature.

So far as we know, all attempts to mold thin sheets of celluloid in the ordinary dies used for embossing paper and leather have been very disappointing, and repeated experiments with the processes usually employed in molding celluloid have convinced us that our new method for producing embossed work is a decided advance in the art.

The dies or molds generally used for relief-work on paper or leather consist of the die proper or female and the "force" or male die. The female die usually carries the design, and the force, consisting wholly or in part of metal, has the design in relief, so as to closely fit the female die when the two are brought together. This distinction between the die and force, however, is not strictly true in every case, for sometimes the die proper is the part of the mold carrying the design in relief, in which case the force would be the female or sunken half of the mold. Probably the die could be best described as that portion of the mold which contains the finished or exposed part of the design, or that part which gives to the molded articles their surface or finished side. The force is then the opposite half of the mold, whether the design upon it be raised or sunken.

When the ordinary methods are applied to molding a thin sheet of celluloid, the result is a very imperfect impression, and even sheets comparatively thick are only molded with difficulty and necessitate repeated pressings. By means of our new method we are enabled with certainty and ease to emboss very thin sheets in either bold or delicate designs, and consequently produce the most beautiful and desirable patterns, applicable to panels, plaques, and other objects in great variety and at a low cost.

The mold which we use consists of a die of metal and a force made of celluloid. To form this force, we simply mold in the die a sheet of seasoned celluloid sufficiently thick to correspond with the depth of the design, and to prevent the celluloid from flowing out of shape when heated we confine it in a metal ring or chase of a proper thickness. The force must be a perfect copy of the design, to effect which sometimes requires two or more moldings. By this means we not only obtain a force which is an exact counterpart of the die, but one which will flow under the heat and pressure used to emboss or mold the thin sheet of celluloid, and thereby force it into every part of the design.

Many attempts have been made to avoid the difficulties attending the use of hard or metal dies by using compressible or yielding materials for the force—such as rubber, felt, paper, &c.; but, so far as we are aware, no one has yet produced a force which will be hard when cold, and yet under the heat and pressure used to form the articles to be molded will not only soften and flow into every part of the die, but will also, if necessary, take on a new shape each time it is used, according to the varying conditions of either the die or substance to be molded, such conditions in our case being the variation in thickness of the celluloid sheet and the difference in the expansion of the die under the influence of different temperatures.

The rigidity and unyielding nature of our force when cold allows us to give it more distinctness in form and to preserve its outlines in all their sharpness, which is impossible when merely compressible materials are used.

The force can be used a great number of times before it wears out, and as this wearing out is due to shrinkage, caused by the further drying or evaporation of solvents from the celluloid with which it is made, the force can be built up and made useful again by adding a sheet or patch of celluloid to the back or face to replace the part lost by shrinkage.

In molding we prefer to use a hydraulic steam-table press; but we generally first heat the die on a separate steam-table, although this separate heating is only done to save the time required when the heating is performed in the press, and thus enable us to have heated dies ready when the press is emptied, or, in other words, to use a double set of dies. We place the sheet of celluloid to be embossed between the die and force, the latter being first lubricated with oil or other suitable lubricant to keep it from adhering to the celluloid sheets. A sheet of metal is laid on the back of the force to prevent it from coming in contact with the steam-table in the press, and we then subject the die and force, with the celluloid to be molded between them, to heat and pressure sufficient to properly mold the celluloid. When fifty to seventy pounds of steam-pressure are used, this requires from three to ten minutes' time and from four hundred to eight hundred pounds pressure on each square inch of the mold, according to its formation, depth, and thickness, impressions of great depth and sharp angles requiring the greatest time and pressure and shallow ones less, and we, therefore, do not limit ourselves to any precise degree of heat and pressure beyond that sufficient to mold the celluloid.

Before releasing the pressure we cool the mold by the well-known method of admitting water to the hollow tables of the press or equivalent method, the cooling of the mold to be sufficient, as is well understood by operators acquainted with the properties of moldable pyroxyline compounds, to lower the temperature of the material, so as to allow it to set or harden and render it sufficiently stiff to be removed from the die without injury.

We may also use a celluloid force made as follows: We take a plaster cast from the die and use this as a model, from which we cast an iron force, which is a rough counterpart of the die. We next press a sheet of felt or other suitable material between the die and cast-iron force, causing it to adhere to the force by means of a very moderate application of shellac varnish. We cut away the high parts of the iron force at the sides to furnish sufficient space for the felt at such points. This gives us a force of cast-iron faced with felt and forming an indistinct counterpart of the die. We next mold a sheet of celluloid about fifty one-thousandths of an inch thick between the iron-felt force and the die, using sufficient heat and pressure to flow the celluloid into every part of the design. After cooling the die and force we separate them, and the celluloid is found attached to the felt, the whole forming a perfect counterpart of the design. The force is now complete and consists of the iron casting, felt, and facing of celluloid. In forming this force it is also necessary to have a perfect copy of the die, and this sometimes requires more than one pressing or molding, as already described. It can also be required when worn out in the same manner as the solid celluloid force by adding a patch of celluloid to the back or face of the celluloid force. In embossing sheets of celluloid this force is used in connection with the die in the same manner as the one made entirely of celluloid.

Our force is especially useful when designs of a bold or very prominent character are to be molded. We do not, of course, confine ourselves to the pyroxyline material known as "celluloid," for, as is well known, other pyroxyline materials of a similar nature are procurable and they can be used for this purpose.

Although we prefer to use celluloid for our force, we can use any other material of about the same degree of hardness when cold that is moldable at about the same temperature. A good material for this purpose is a mixture of glue, water, linseed-oil, molasses, and some pigment like zinc oxide, these ingredients being mixed in any convenient manner, as by first soaking the glue in the water and then adding the other ingredients when the glue is heated, and finally grinding the whole together in rolls until it is thoroughly mixed. The water is then allowed to dry from the mixture, when it is ready to mold into forces, the treatment being the same as when celluloid is used, except that this mixture is not as conveniently formed into sheets as celluloid and requires a little more trouble in first forming the force.

The following proportions will make an efficient mixture for the substitute for the celluloid force: Glue, ten pounds; water, five pounds; molasses, five pints; raw linseed-oil, three and three-fifths pints; oxide of zinc, thirty-six pounds.

Having fully described our invention, what we desire to claim and secure by Letters Patent is—

1. The process of embossing celluloid or other pyroxyline material, which consists in the following steps: first, placing the material to be embossed between a die and a force composed of a plastic substance moldable under heat and pressure at about the same temperature as the material to be embossed; second, bringing the force into contact with the material to be embossed; third, subjecting the material to be embossed and the force to heat and pressure sufficient to cause them both to flow, and continuing the pressure until the material to be embossed is forced into the die; fourth, allowing the die, force, and the material to be embossed, while still in contact, to cool, and, fifth, separating the material to be embossed from the die and force, all substantially as herein described.

2. The process of embossing celluloid or other pyroxyline material, which consists in the following steps: first, placing the material to be embossed between a die and a force composed of celluloid or analogous material; second, bringing the force into contact with the material to be embossed; third, subjecting the material to be embossed and the force to heat sufficient to cause them both to flow, and continuing the pressure until the material to be embossed is forced into the die; fourth, allowing the die, force, and the material to be embossed, while still in contact, to cool, and, fifth, separating the material to be embossed from the die and force, all substantially as herein described.

WILLIAM H. WOOD.
GEORGE C. GILLMORE.

In presence of—
JOHN A. BARTON,
EDWIN S. SCHENCK.

Correction in Reissue Letters Patent No. 11,074.

It is hereby certified that in Reissue Letters Patent No. 11,074, granted April 15, 1890, upon the application of William H. Wood and George C. Gillmore, of Newark, New Jersey, for an improvement in "Process of Embossing Sheets of Celluloid," an error appears in the printed specification requiring correction as follows: In line 68, page 2, the word "required" should read *repaired;* and that the said Letters Patent should be read with this correction therein that the same may conform to the record of the case in the Patent Office.

Signed, countersigned and sealed this 22d day of April, A. D. 1890.

[SEAL.]

CYRUS BUSSEY,
*Assistant Secretary of the Interior.*

Countersigned:

C. E. MITCHELL,
*Commissioner of Patents.*